United States Patent
Halpap et al.

(10) Patent No.: US 8,764,886 B2
(45) Date of Patent: Jul. 1, 2014

(54) APPARATUS FOR SEPARATING LIQUID DROPLETS OUT OF A FEED GAS STREAM COMPRISING THEM WITH A LIQUID LOADING OF > 10 L OF LIQUID/M³ OF FEED GAS

(75) Inventors: Joerg Halpap, Mannheim (DE); Andreas Bode, Mannheim (DE); Eberhard Herrmann, Frankenthal (DE); Markus Linsenbuehler, Heidelberg (DE); Bernd Sachweh, Meckenheim (DE); Michael Pilz, Hemsbach (DE); Michael Mertler, Freinsheim (DE); Matthias Wilhelm Meier, Ludwigshafen (DE)

(73) Assignee: BASF SE (DE)

( * ) Notice: Subject to any disclaimer, the term of this patent is extended or adjusted under 35 U.S.C. 154(b) by 189 days.

(21) Appl. No.: 13/515,180

(22) PCT Filed: Dec. 13, 2010

(86) PCT No.: PCT/EP2010/069516
§ 371 (c)(1),
(2), (4) Date: Jun. 11, 2012

(87) PCT Pub. No.: WO2011/082972
PCT Pub. Date: Jul. 14, 2011

(65) Prior Publication Data
US 2012/0285322 A1  Nov. 15, 2012

(30) Foreign Application Priority Data
Dec. 15, 2009  (EP) ..................................... 09179221

(51) Int. Cl.
*B01D 45/12*  (2006.01)

(52) U.S. Cl.
USPC ................ 95/271; 55/459.1; 55/424; 55/426; 55/337; 55/342; 55/315; 55/338; 55/340; 55/DIG. 14

(58) Field of Classification Search
USPC ......... 55/459.1, 424, 426, DIG. 14, 337, 342, 55/315, 338, 340; 95/271
See application file for complete search history.

(56) References Cited

U.S. PATENT DOCUMENTS

| | | | | |
|---|---|---|---|---|
| 3,502,441 A | * | 3/1970 | Hudson | ......................... 422/234 |
| 3,809,438 A | * | 5/1974 | Hubbard | ........................ 406/106 |
| 5,116,488 A | | 5/1992 | Torregrossa | |
| 2005/0252837 A1 | * | 11/2005 | Haland | ........................... 210/97 |

FOREIGN PATENT DOCUMENTS

| | | |
|---|---|---|
| DE | 3930951 A1 | 10/1990 |
| EP | 0473566 A2 | 3/1992 |

(Continued)

*Primary Examiner* — Jason M Greene
*Assistant Examiner* — Dung H Bui
(74) *Attorney, Agent, or Firm* — Drinker Biddle & Reath LLP

(57) ABSTRACT

An apparatus, for separating liquid droplets out of a feed gas stream, includes a delay vessel for preliminary separation of some of the liquid droplets out of the feed gas stream under gravity, with an inlet line for the feed gas stream and an outlet line for the gas stream which has been depleted of liquid droplets and which flows out of the delay vessel and a tangential supply thereof into a centrifugal droplet separator. The outlet line is arranged in the upper region of the delay vessel and spaced apart from the inlet line to such an extent that the delay time of the gas stream in the delay vessel is at a maximum, and with an outlet line for the liquid separated in the delay vessel at the base thereof.

9 Claims, 1 Drawing Sheet

(56) References Cited

FOREIGN PATENT DOCUMENTS

| GB | 700511 | A | 12/1953 |
| GB | 2239193 | A | 6/1991 |
| JP | 62074425 | A | 4/1987 |
| WO | WO-2011082975 | A1 | 7/2011 |

* cited by examiner

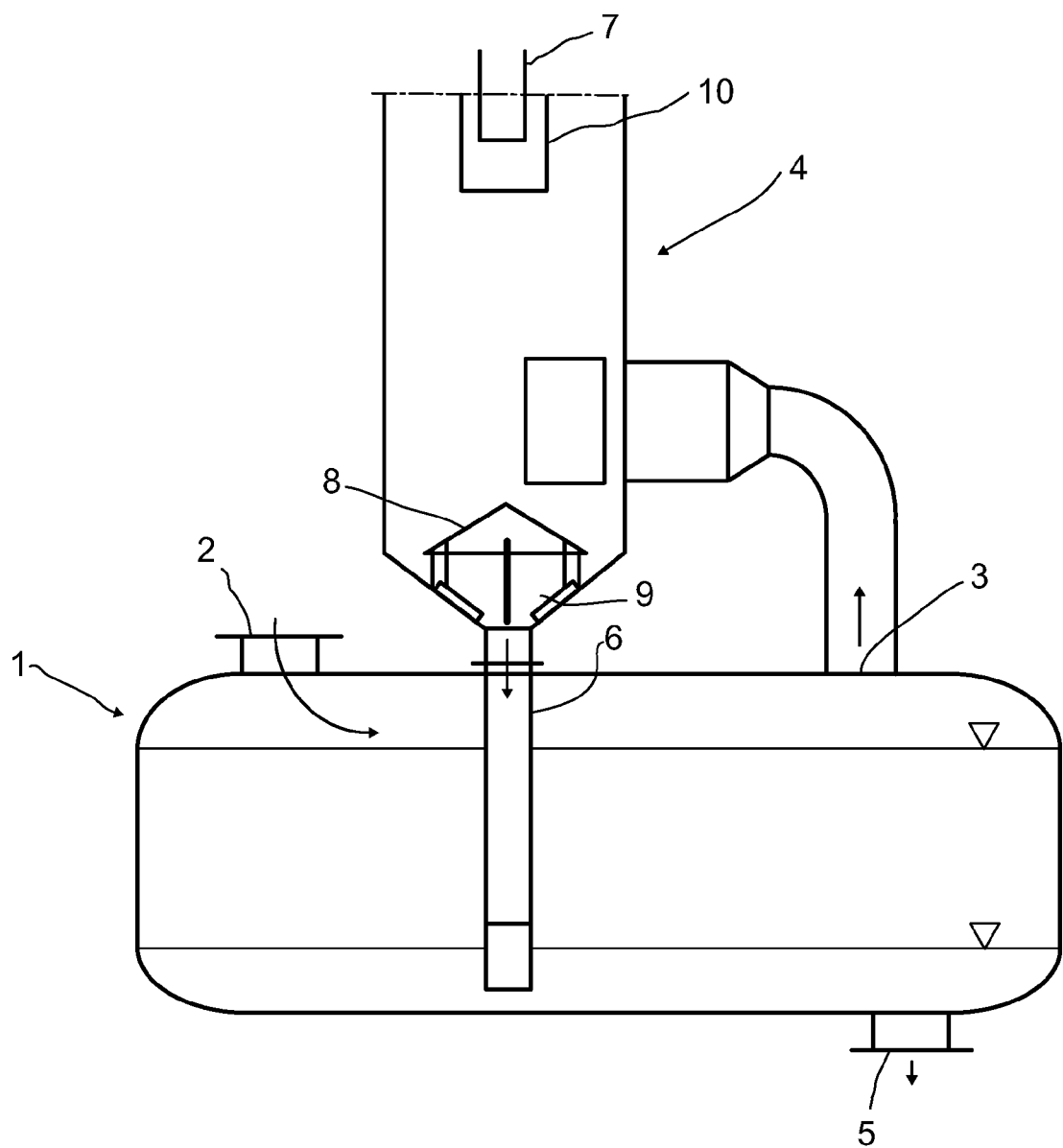

APPARATUS FOR SEPARATING LIQUID DROPLETS OUT OF A FEED GAS STREAM COMPRISING THEM WITH A LIQUID LOADING OF > 10 L OF LIQUID/M³ OF FEED GAS

PRIORITY

Priority is claimed as a national stage application, under 35 U.S.C. §371, to PCT/EP2010/069516, filed Dec. 13, 2010, which claims priority to European Application No. 09179221.8, filed Dec. 15, 2009. The disclosures of the aforementioned priority applications are incorporated herein by reference in their entirety.

The invention relates to an apparatus for separating liquid droplets out of a feed gas stream comprising them.

Centrifugal droplet separators, also referred to as cyclones, are known in process technology and are used, for example, to separate liquid droplets out of gas streams comprising them. Centrifugal droplet separators (cyclones) are rotationally symmetric apparatuses with a generally vertical axis of rotation, frequently predominantly cylindrical apparatuses. By supplying the biphasic liquid/gas mixture to be separated tangentially, a spiral motion is imposed thereon along the inner wall of the apparatus, the components of the mixture being separated as a function of the density thereof under the action of centrifugal force. The heavier liquid droplets are separated out of the gas at the inner walls of the centrifugal droplet separator, collect in the lower region of the apparatus and are discharged through an outlet stub.

In the case of viscous and/or tacky liquids and/or liquids comprising liquids and/or solids which tend to encrustation, the problem may occur that the liquid droplets or the solid crusts are deposited on the inner walls of the apparatus, and no longer run off via the outlet stub, resulting in fouling combined with deteriorating separation, and finally in flooding of the apparatus.

Further apparatuses are also known for separation of liquid droplets out of gas streams for low liquid loadings, especially lamellar separators, cyclonic droplet separators or wire meshes. In these apparatuses, deposits may, however, result in crust formation, such that constantly high degrees of separation cannot be achieved over a prolonged period because the elements relevant for the separation are deactivated or blocked within a very short time by deposits.

In general, discontinuous or else continuous cleaning of these apparatuses is effected by means of spray nozzles. The cleaning liquid is sprayed in disperse form into the gas stream and has to be separated out of it again.

Centrifugal droplet separators, in contrast, are significantly less prone to soiling and can additionally also be used for high liquid loadings.

All droplet separators have an upper limit of liquid loading. In general, this limit is at its highest for the centrifugal droplet separators. For very high degrees of separation of >99%, this limit for the centrifugal droplet separators is at a maximum liquid loading (liquid loading limit) frequently of about 10 l of liquid per m³ of gas. At higher loadings, liquid is entrained into the cleaning gas. At very high loadings, this can occur in the manner of a surge.

Gas streams which have a higher liquid loading than the loading limit for a centrifugal droplet separator must therefore, before being supplied to a centrifugal droplet separator, first be depleted in a preliminary separator or coarse separator to a liquid content below the loading limit with which the centrifugal droplet separator can be charged. For this purpose, for example, a delay vessel can be used, in which the liquid droplets separate out under the action of gravity, the dimensions of which must be sufficient to ensure the required preliminary separation (coarse separation).

The apparatuses known to date for the overall process of separation, i.e. preliminary separation (coarse separation) and fine separation, however, required a large amount of space. Furthermore, the separation was effected in different vessels.

It was accordingly an object of the invention to provide a compact apparatus for separating liquid droplets out of a gas stream comprising them, which is suitable for separating liquid droplets out of gas streams with a high liquid loading, above the loading limit permissible for a centrifugal droplet separator.

The object is achieved by an apparatus for separating liquid droplets out of a feed gas stream comprising them with a liquid loading of >10 l of liquid/m³ of feed gas, comprising a delay vessel for preliminary separation of some of the liquid droplets out of the feed gas stream under the action of gravity, with an inlet line for the feed gas stream into the delay vessel and an outlet line for the gas stream which has been depleted of liquid droplets and flows out of the delay vessel, and at least one tangential supply thereof into a centrifugal droplet separator, in which fine separation is effected, the outlet line being arranged in the upper region of the delay vessel and being spaced apart from the inlet line to the maximum degree, and with an outlet line for the liquid separated in the delay vessel at the base thereof, and wherein the centrifugal droplet separator used is an axially symmetric apparatus with a vertical longitudinal axis and circular cross section, with a jacket and hoods at the upper and lower ends of the jacket, and wherein an outlet line for the liquid separated in the centrifugal droplet separator is arranged in the region of the lower hood of the centrifugal droplet separator and is designed such that it is immersed into the liquid standing at the base of the delay vessel or into a liquid standing in a cup in the interior of the delay vessel (1) and with a gas outlet line at the upper end of the centrifugal droplet separator for the gas stream purified further in the centrifugal droplet separator, and wherein both the supply of the gas stream depleted of liquid droplets from the delay vessel via the outlet line into the centrifugal droplet separator and the removal of the liquid separated in the centrifugal droplet separator via the outlet line into the delay vessel are effected without the use of pumps and shutoff devices.

It has been found that it is possible to provide a compact unit for separation of liquid droplets out of gas streams with high liquid loading, which has large free cross sections, such that separating performance declines only very slowly even in the case of deposition on the inner surfaces, because the separation mechanism is disrupted only insignificantly. In zones with increased gas velocity, for example gas inlet zones, partial self-cleaning is additionally expected.

The delay vessel and the arrangement of the inlet line for the feed gas stream into the delay vessel and the outlet line in the upper region of the delay vessel for the gas stream which has been depleted of liquid droplets and flows out of the delay vessel are preferably designed such that the residence time of the gas stream in the delay vessel is at least 2 minutes.

The delay vessel is preferably configured as a predominantly cylindrical apparatus with a horizontal longitudinal axis, wherein the inlet line for the feed gas stream and the outlet line for the gas stream depleted of liquid droplets are each arranged in the upper region thereof and preferably as far removed from one another as possible.

The outlet stub for the liquid separated out in the centrifugal droplet separator into the delay vessel must be immersed in liquid in the delay vessel in order to prevent bypass flow of the feed gas stream out of the delay vessel into the centrifugal droplet separator via the outlet stub without preliminary separation of some of the liquid droplets out of the feed gas stream under the action of gravity in the delay vessel. For this purpose, the outlet stub may be designed such that it ends below the liquid level of the liquid separated out at the base of the delay vessel, though it is also possible that the outlet stub ends in a cup below the liquid level of a liquid present therein. The cup must be arranged in the interior of the delay vessel, though the geometry, dimensions and position thereof in the delay vessel are not restricted. The liquid present in the cup is preferably the same as the liquid separated out in the delay vessel. The embodiment with immersion of the outlet stub into a liquid-filled cup has the advantage over the embodiment with immersion into the liquid standing at the base of the delay vessel that the liquid holdup in the cup may be smaller.

In a preferred embodiment, the centrifugal droplet separator has, over the outlet stub, at the lower end thereof, an apex cone and baffles in the form of metal sheets arranged radially and vertically at the base of the lower hood.

For manufacturing reasons, an apex cone open at the bottom is preferred.

In a further preferred embodiment, the centrifugal droplet separator has, in the region of the upper hood, around the gas outlet line, a drip skirt which is open at the bottom, at which liquid droplets are separated out of the gas stream which leads through the gas outlet line.

The drip skirt is preferably at least 20% longer than the part of the gas outlet line which projects into the interior of the centrifugal droplet separator and is also referred to as immersed tube.

The tangential supply of the gas stream flowing out of the delay vessel via the outlet line into the centrifugal droplet separator is effected via an intake which may be equipped differently in geometric terms: it may, for example, be circular, which is advantageous especially in the case of pressurized apparatuses, square or else rectangular. In a preferred embodiment, the tangential supply of the gas stream leaving the delay vessel via the outlet line into the centrifugal droplet separator is via a rectangular intake with a height greater than its width. The ratio of height to width of the rectangular intake into the centrifugal droplet separator is preferably in the range from 2.5:1 to 5:1, preferably 3:1.

In a further preferred embodiment, in the region of the upper hood of the centrifugal droplet separator, two, three or more inlet orifices arranged symmetrically on the circumference of the upper hood are provided for a tangential supply of cleaning liquid, in the same direction as the supply of the depleted gas stream out of the delay vessel into the centrifugal droplet separator via the outlet line.

The cleaning liquid is matched to the particular substance system; more particularly, it should not evaporate or should have only a low vapor pressure under process conditions, and should preferably be miscible with the liquid separated out of the feed gas stream.

The invention is illustrated in detail hereinafter by a drawing.

The sole FIGURE, FIG. 1, shows a longitudinal section through an embodiment of an inventive apparatus for separation of liquid droplets out of a gas stream.

The compact separator shown in FIG. 1 comprises a delay vessel 1 with an inlet line 2 for the feed gas stream and outlet line 3 for the gas stream which has been depleted of liquid droplets and flows out of the delay vessel 1, and tangential supply thereof via an intake, which is square in the preferred embodiment shown in the FIGURE, to a centrifugal droplet separator 4. The outlet line 3 is arranged in the upper region and to the intake 2. The delay vessel 1 has, at its lower end opposite the inlet line 2, an outlet line 5 for the liquid separated out in the delay vessel. The centrifugal droplet separator 4 is, in the preferred embodiment shown in the FIGURE, a tall cylindrical apparatus with supply of the partly depleted gas stream from the delay vessel 1 via the outlet line 3 and removal of the cleaned gas stream via the central gas outlet stub 7. In the preferred embodiment shown in the FIGURE, in the region of the lower hood which is preferably in frusto-conical form, is arranged an apex cone 8 open at the bottom for protection of the liquid which has already separated out and for stabilization of the central vortex, and baffles 9 in the form of metal sheets arranged radially and vertically at the base of the lower hood. The outlet line 6 at the lower end of the centrifugal droplet separator reaches down to below the liquid level in the delay vessel 1.

The invention claimed is:

1. A process for separating liquid droplets out of a feed gas stream, comprising: them with a liquid loading of the feed gas stream to greater than 10 l of liquid/m$^3$ of feed gas in an apparatus, comprising a delay vessel, preliminary separating separation of some of the liquid droplets out of the feed gas stream under the action of gravity, in the delay vessel with an inlet line for the feed gas stream into the delay vessel and an outlet line for the a gas stream which has been depleted of liquid droplets and which flows out of the delay vessel, and providing a tangential supply of the gas stream which has been depleted of liquid droplets thereof into a centrifugal droplet separator, the outlet line being arranged in an upper region of the delay vessel above the liquid level of the separated liquid and being spaced apart from the inlet line to such an extent that delay time of the gas stream in the delay vessel is at a maximum, and with an outlet line for the liquid separated in the delay vessel at a base of the delay vessel, thereof, and wherein the centrifugal droplet separator used is an axially symmetric apparatus with a vertical longitudinal axis and a circular cross section, with a jacket and upper and lower hoods at upper and lower ends of the jacket, and wherein an outlet stub for the liquid separated in the centrifugal droplet separator is arranged in a region of the lower hood of the centrifugal droplet separator and has such dimensions that it is dimensioned to be immersed into liquid standing at the base of the delay vessel or into liquid standing in a cup in the interior of the delay vessel or into a liquid standing in a cup in the interior of the delay vessel, and with a central gas outlet stub at the upper end of the centrifugal droplet separator for the gas stream purified further in the centrifugal droplet separator, and wherein both the tangential supply of the gas stream depleted of liquid droplets from the delay vessel via the outlet line and removal of the liquid separated in the centrifugal droplet separator via line into the delay vessel are effected without the use of pumps and shutoff devices.

2. The process according to claim 1, wherein residence time of the gas stream in the delay vessel is at least two minutes.

3. An apparatus for separating liquid droplets out of a feed gas stream comprising them with a liquid loading of the feed gas stream being greater than 10 l of liquid/m$^3$ of feed gas in an the apparatus, the apparatus comprising: a delay vessel for preliminary separation of some of the liquid droplets out of the feed gas stream under the action of gravity, with an inlet line for the feed gas stream into the delay vessel, and an outlet line for the gas stream which has been depleted of liquid droplets and flows out of the delay vessel, and a tangential supply thereof into a centrifugal droplet separator, the outlet line being arranged in the upper region of the delay vessel above the liquid level of the separated liquid and being spaced apart from the inlet line to such an extent that delay time of the gas stream in the delay vessel is at a maximum, and with an outlet line for the liquid separated in the delay vessel at the a base of the delay vessel thereof, and wherein the centrifugal droplet separator used is an axially symmetric apparatus with a vertical longitudinal axis and a circular cross section, with a jacket and upper and lower hoods at upper and lower ends of the jacket, and wherein an outlet stub for the liquid separated in the centrifugal droplet separator is arranged in a region of the lower hood of the centrifugal droplet separator and has such dimensions that it is dimensioned to be immersed into the liquid standing at the base of the delay vessel or into a liquid standing in a cup in the interior of the delay vessel or into a liquid standing in a cup in the interior of the delay vessel, and with a central gas outlet stub at the upper end of the centrifugal droplet separator for the gas stream purified further in the centrifugal droplet separator, and wherein both the supply of the gas stream depleted of liquid droplets from the delay vessel via the outlet line and removal of the liquid separated in the centrifugal droplet separator via line into the delay vessel are effected without the use of pumps and shutoff devices wherein the delay vessel is configured as a predominantly cylindrical apparatus with a horizontal longitudinal axis, and the inlet line for the feed gas stream and the outlet line for the gas stream depleted of liquid droplets are each arranged in the upper region thereof.

4. The apparatus according to claim 3, wherein the centrifugal droplet separator has, over the outlet stub, at the lower end thereof, an apex cone and baffles in the form of metal sheets arranged radially and vertically at the a base of the lower hood.

5. The apparatus according to claim 3, wherein the centrifugal droplet separator has, in a region of the upper hood, around the outlet line for the gas stream which has been depleted of liquid droplets, a drip skirt which is open at the bottom, at which liquid droplets are separated out of the gas stream which leads through the gas outlet line.

6. The apparatus according to any of claim 3, wherein the tangential supply of the gas stream leaving the delay vessel via the outlet line for the gas stream which has been depleted of liquid droplets into the centrifugal droplet separator is via a rectangular intake with a height greater than its width.

7. The apparatus according to claim 6, wherein the ratio of height to width of the rectangular intake into the centrifugal droplet separator is in the range from 2.5:1 to 5:1.

8. The apparatus according to claim 7, wherein the ratio of height to width of the rectangular intake into the centrifugal droplet separator is in the range from 3:1.

9. The apparatus according to claim 3, wherein the inlet line for the feed gas stream and the outlet line for the gas stream depleted of liquid droplets are each arranged as far removed from one another as possible at two ends of the delay vessel.

\* \* \* \* \*